United States Patent [19]

Tachihara et al.

[11] 3,753,197

[45] Aug. 14, 1973

[54] PHOTOCONDUCTIVE CELL

[75] Inventors: Norifumi Tachihara, Tokyo; Hiroshi Yamaguchi, Tokorozawa, both of Japan

[73] Assignee: Kabushiki Kaisha Koparu, Tokyo, Japan

[22] Filed: July 14, 1971

[21] Appl. No.: 162,560

[30] Foreign Application Priority Data

July 20, 1970 Japan ................................ 45/63418

[52] U.S. Cl. ...................................... 338/19, 29/588

[51] Int. Cl. ................................................ H01c 7/08

[58] Field of Search .................... 338/15, 17, 18, 19; 29/572, 583, 588; 250/200, 211; 252/501

[56] References Cited

UNITED STATES PATENTS

| | | | |
|---|---|---|---|
| 3,013,232 | 12/1961 | Lubin | 338/17 |
| 2,987,686 | 6/1961 | McQuistan | 338/18 |
| 3,177,576 | 4/1965 | Kuzminski | 29/572 |
| 3,444,614 | 5/1969 | Scholer | 29/588 |

*Primary Examiner*—C. L. Albritton
*Attorney*—Cushman, Darby & Cushman

[57] ABSTRACT

A photoconductive cell comprising an electrically insulated base plate carrying, on one surface, a light-sensitive substance capable of varying its resistance value with the intensity of the light incident thereto and also a conductive substance electrically connected with the light-sensitive substance, terminals connected to the conductive substance, and two sheets of electrically insulated transparent or translucent films bonded tightly to each other forming a sealed envelope sandwiching both the base plate and the terminals between the two films. The sealing of these films is accomplished either by the use of a bonding agent, or by relying on the heat-sealing method, the high frequency wave sealing method or the ultrasonic wave sealing method. Thus, very thin photoconductive cell can be manufactured easily on mass production basis at low cost.

4 Claims, 13 Drawing Figures

INVENTORS
NORIFUMI TACHIHARA
BY HIROSHI YAMAGUSHI
Cushman, Darby & Cushman

INVENTORS
Norifumi Yoshihara
Hiroshi Yamaguchi
BY
Cushman, Darby & Cushman

INVENTORS
Norifumi Toshihara
Hiroshi Yamaguchi
BY
Cushman, Darby & Cushman

PHOTOCONDUCTIVE CELL

BACKGROUND OF THE INVENTION

1. Field of the invention

The present invention is concerned with a photoconductive cell and more particularly, it relates to a photoconductive cell arranged to have a small overall thickness and to be suitable for being manufactured on a mass production basis.

2. Description of the prior art

Recent remarkable progress on the techniques of producing semiconductor element has made it possible to use various kinds of light-responsive substances for production of photoconductive cells.

However, these light-responsive substances invariably are defective in that they are of a poor resistivity to moisture, that is to say, their sensitivity to light is lost to a great extent as soon as they absorb moisture. For this reason, it is necessary that light-responsive substances be shut out and protected from the external atmosphere which contains moisture. In case light-responsive substances are utilized in photoconductive cells, it is customary to keep such a substance in the state of being protected in a casing. Such a casing or an envelope which is employed in practice includes metal casing, glass envelope and resinous capsule.

For example, as can be conjectured from the accompanying FIG. 1*a*, a conventional photoconductive cell enclosed in a glass casing is constructed in such a way that a bare element or element member 1 having a light-responsive substance coated thereon is sealed by a metal base 2 having lead wires 2*b* and 2*b* which, in turn, are supported via pieces of an insulating material 2*a* and 2*a* and also by a metal cap 3 having a glass window 3*a* at the top thereof. The element member 1 is provided with a light-sensitive portion 1a having a light-responsive substance such as CdS coated thereon, and also with electrode portions 1*b* and 1*b* consisting of an evaporation-deposited conductive substance, such as indium, which forms electrodes. In the attachment holes 1*c* and 1*c* - which serve as the centers of the collecting regions of the electrode portions 1*b* and 1*b* - are inserted the lead wires 2*b* and 2*b*, respectively, at the time the photoconductive cell is assembled. A conductive substance, such as silver paste 4 (see FIGS. 1*b* and 1*c*), is deposited onto the regions of the attachment holes carrying the lead wires 2*b* and 2*b* inserted therein. Such a metal encased photoconductive cell is superior in that it can exclude hygroscopicity. However, the provision of the top glass window 3*a* weakens the strength of this cell against mechanical impact. Besides, it uses a costly metal casing which has to be selected appropriately by taking into account the thermal expansion coefficient of the metal to glass. Furthermore, this prior cell has further drawbacks in that it requires too many steps of attachment and sealing and too difficult configurations of component parts to be suitable for quantity production.

In FIG. 1*b*, there is shown another conventional photoconductive cell which is sealingly enclosed in a glass casing 5. In the manufacture of a cell of this type, the lead wires 2*b* and 2*b* are fused, at the time of sealing, to the glass at the outlet portions 5*a* and 5*a* which are formed in the bottom of the glass casing 5. Hence, there arises the necessity for the protection of the element member 1 from heat. This necessity makes it mandatory to provide a substantial distance between the bottom of the glass casing 5 and the element member 1 which is mounted above a reinforcement member 6. Such an arrangement, in turn, makes it difficult to provide the cell in a compact size. In addition, the glass casing is weak in its resistance to impact. Moreover, the glass casing presents the problem that precise uniformalization of its external configuration is difficult. The cell of this type has a further disadvantage similar to that discussed with the metal encased cell in respect of mass production.

FIG. 1*c* shows another conventional photoconductive cell which is enclosed in a resinous casing. The cell of this type is superior in its resistance to impact and in the uniformalization of configuration in case it is manufactured on a mass production basis. However, the junction 9 between the resinous cap 7 and the resinous base 8 is not always established in the desired fashion, and fine pin holes or cracks tend to develop at the junction after the latter is produced. As a result, the element member 1 will easily bacome exposed to moisture through these fine pin holes or cracks to be absobed by the element. Besides, the cell of this type has further drawbacks that it is difficult to insure the strength of bonding at the junction, and to insure stability of bonding against changes with time from the aspect of binding technique. Not only those, but also this cell has similar defects as those described above in connection with the preceding two kinds of prior cell.

SUMMARY OF THE INVENTION

It is, therefore, the object of the present invention to provide an improved photoconductive cell comprising a bare element carrying a light-responsive substance coated thereon and lead wires both of which are sandwiched and gas-tightly enveloped between two electrically insulating transparent or translucent sheets of films which are sealingly bonded to each other firmly.

The aforesaid object of the present invention is attained by having the aforesaid bare element which carries thereon a light-responsive substance and the lead wires sandwiched between two sheets of films of the type described and by bonding these two films tightly together in a vacuous state to thereby produce a seal, by the use of bonding agent or by relying on the heat sealing method, or the high frequency wave sealing method or the ultrasonic wave sealing method. Thus, it is possible to produce compact photoconductive cells having an excellent anti-impact property easily at a low cost on a mass production basis.

DESCRIPTION OF THE PREFERRED EMBODIMENTS

Figure 1A:
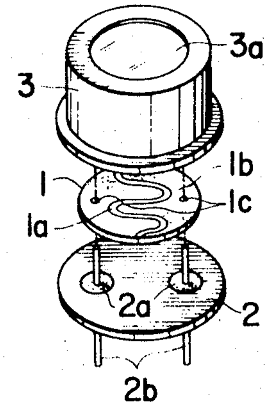
FIG. 1*a* is a perspective view of an example of known photoconductive cell which is provided in a longitudinally exploded fashion.
Figure 1B:
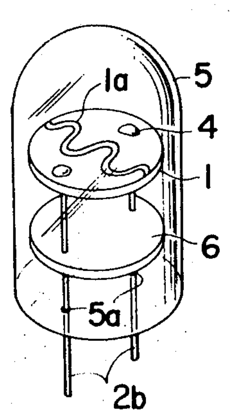
FIG. 1*b* is a perspective view of another example of known photoconductive cell.
Figure 1C:
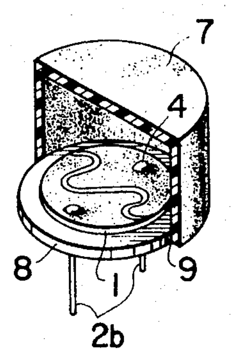
FIG. 1*c* is a perspective view, partly in section, of still another example of known photoconductive cell.

In FIGS. 2 to 6, reference numeral 10 represents an electrically insulating base plate having a light-sensitive portion 10*a* produced by coating a light-responsive substance thereon, and electrode portion 10*b* produced by coating a conductive substance thereon and connected electrically with the light-sensitive portion 10*a*. This base plate 10 is usually called a bare element. Numerals 11*a* and 11*b* represent lead wires, respectively, which are each made with an elongated strip-like conductive material and which are provided in such positions as to correspond to the electrode portions 10*b* and 10*b*, respectively. Numeral 12 represents a ribbon-like electrically insulating, optically transparent - including translucent - flat film. Numeral 13 represents another ribbon-like film having an electrically insulating property. It is postulated, of course, that these two films 12 and 13 are of superior damp-proofness and weather resistivity.

Figure 2:
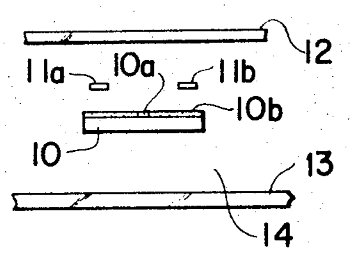
FIG. 2 is a side elevational view of a photoconductive cell of the present invention, showing the arrangement of component parts before they are closely sandwiched between two transparent films which are then tightly bonded together to produce a seal.
Figure 3:
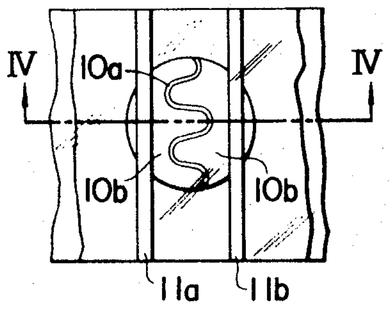
FIG. 3 is a plan view of a photoconductive cell of the present invention, showing the arrangement of component parts after they are closely sandwiched between two transparent films which are now closely bonded together forming a seal.
Figure 4:
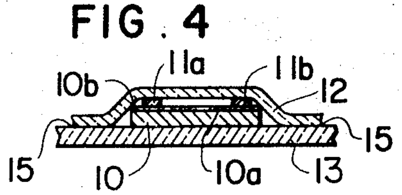
FIG. 4 is a sectional view taken along the line IV—IV in FIG. 3.
Figure 5:
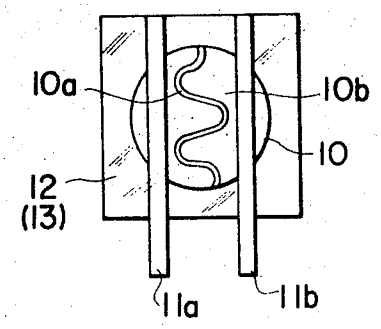
FIG. 5 is a plan view of an example of photoconductive cell of the present invention which has been shaped ready for use.
Figure 6:
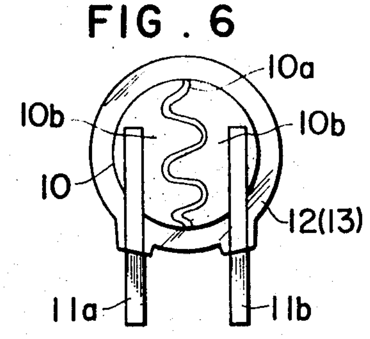
FIG. 6 is a plan view of another example of photoconductive cell of the present invention which is made into a shape different from that of FIG. 5.

Description will hereunder be directed to the assemblage and manufacture of the cell of the present invention. Parts 13, 10, 11*a*, 11*b* and 12 which constitute a photoconductive cell of the present invention are superposed one upon another in the order as shown in FIG. 2 and the resulting stack of parts is housed in a space 14 defined by air-tightness-maintaining members not shown in the manner as shown in FIG. 3. Thereafter, the air present in the space 14 is sucked out from below the film 13 to lower the atmospheric pressure within the space 14. Whereupon, the two films 12 and 13 will be caused to become in tight contact with each other in the state of having - sandwiched therebetween - both the bare element 10 and the lead wires 11*a* and 11*b* which are bonded to the electrode portions 10*b* and 10*b*, respectively. As a result, one 12 of the two films which has till then been flat deforms in such a fashion as to surround the bare element 10. It should be understood that both of the films 12 and 13 may deform. As a consequence, the element 10 is sealed. In this instance, the regions of contact 15 and 15 are tightly bonded together by an appropriate bonding agent in order to ensure air-tightness in these regions. In this state of the stacked component parts, lead wires 11*a* and 11*b* are contacted under pressure with the electrode portions 10*b* and 10*b* of the bare element 10 and serve as the electrode terminals extending outside of the envelope of films. After assemblage, the cell is cut apart from its adjacent similar units into appropriate shape as shown in FIG. 5 ready for use. Also, by arranging the lead wires 11*a* and 11*b* at appropriate positions preliminarily, it is possible also to obtain photoconductive cells of such a type as shown in FIG. 6.

Description has been made on an instance in which a photoconductive cell is assembled by relying on the vacuum sealing technique. It should be understood, however, that this assemling may be performed by relying on other methods. For example, the film 12 is pressed downwardly directly onto the film 13 by the use of an appropriate jig. Alternatively, a cap-like region may be formed in the film 12 by the use of an appropriate jig and thereafter the resulting film 12 is pressed downwardly onto the other 13 of the films. Thus, these two films 12 and 13 are bonded together firmly by a bonding agent to produce a completed cell unit having a configuration as, for example, shown in FIG. 4. Also, in lieu of bonding the closely contacting faces of two films with an adhesive, the films may be fused together by radioheating or by ultrasonic wave oscillation.

Figure 7:
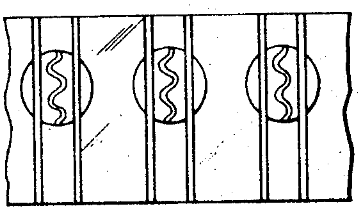
FIG. 7 is a plan view corresponding to FIG. 3, showing an example of arrangement suitable for quantity production.
Figure 8:
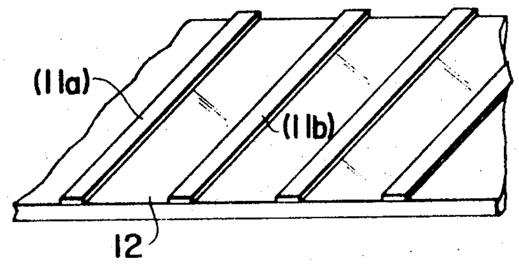
FIG.8is a perspective view of a transparent film having lead wires formed integrally therewith preliminarily.

In FIG. 7, there is shown a fragmentary view, on reduced scale, of the arrangement of parts suitable for manufacturing the photoconductive cells of the present invention on a mass production basis. FIG. 3 corresponds to the representation of one unit cut apart from the fragmentary illustration of FIG. 7. As is clear from FIG. 7, a number of spaced cell units having component parts arranged at desired positions may be assembled uniformly at the same time. It is only necessary to cut them into an appropriate shape after they are assembled. In case a number of cells having uniformalized arrangement of units are produced at the same time, their mass productivity may be enhanced further if lead wires are formed by strips of copper foil - corresponding to lead wires 11*a* and 11*b* - which are printed directly on one side of the film 12 as shown in FIG. 8.

Description will next be directed to some examples of the manner in which photoconductive cells of the present invention are constructed.

EXAMPLE I

As the films 12 and 13, polyimide films (Kapton F) were used. Strips of copper foil were hot-melted onto a surface of film 12 to serve as the lead wires 11*a* and 11*b*. A plurality of bare elements 10 which had been prepared beforehand were disposed in spaced relations on the film 13 in the manner as shown in FIG. 7. The film 12 was superposed on top of all of these spaced bare elements. Thereafter, the films 12 and 13 were pressed toward each other at opposite sides to bring them into close contact with each other. Then, the closely contacting regions of these two films 12 and 13 were fused together by heating.

EXAMPLE II

As the films 12 and 13, polyimide films (Kapton H) were used. An adhesive SKYBOND No. 700, a product of Monsant Chemical Corporation was applied onto the inner side of the film 13. Thereafter, a plurality of bare elements were sealed in the same manner as that of EXAMPLE I.

EXAMPLE III

As the films 12 and 13, transparent polyester films were used. A micro-capsulated transparent epoxy resin adhesive was applied onto the inner face of film 12. On the other hand, a micro-capsulated epoxy hardening agent was applied onto the inner face of film 13. Bare elements 10 and lead wires 11*a* and 11*b* were sandwiched between films 12 and 13. The closely contacting regions of these films 12 and 13 were bonded together by the application of a pressure onto said contacting regions from the opposite directions.

Figure 9:
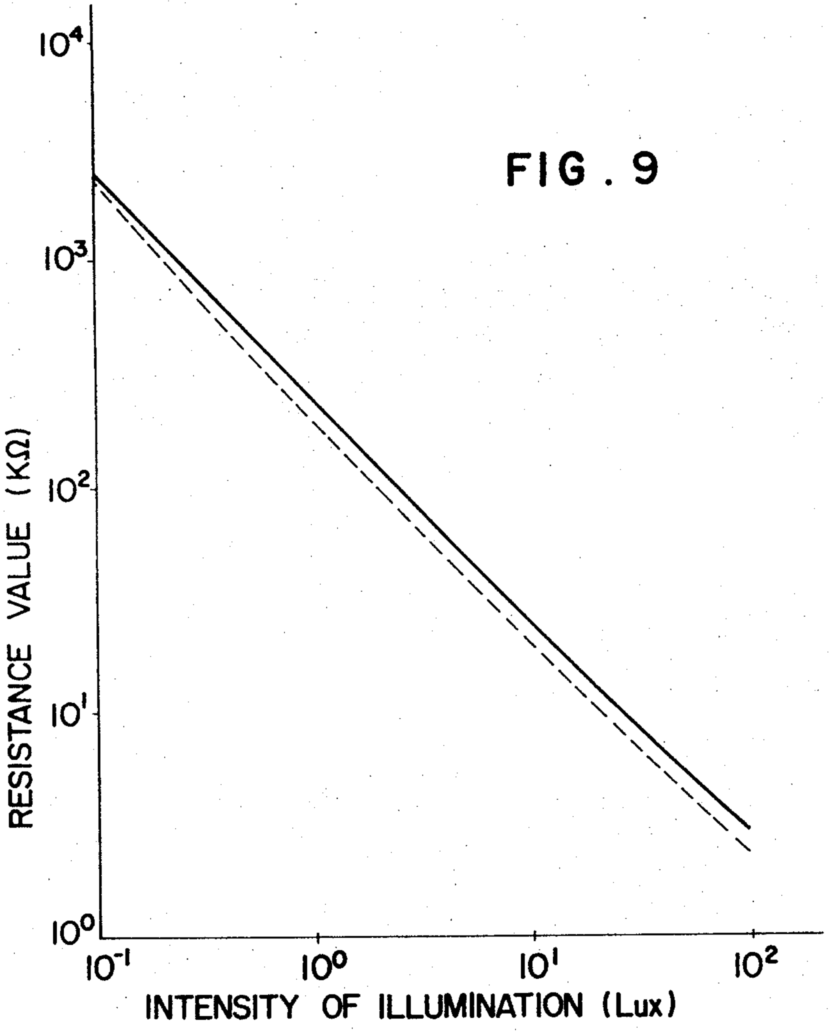
FIG. 9 is a chart showing a comparison of variation characteristic of illumination-resistance value between the cell of the present invention and a known cell.
Figure 10:
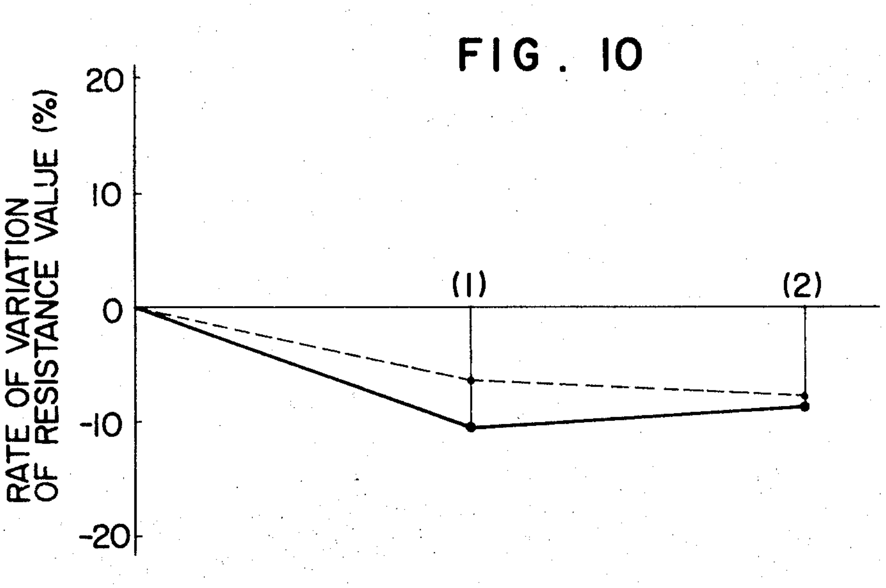
FIG. 10 is a chart showing a comparison of the results of thermal cycling test between the cell of the present invention and a known cell.

The photoconductive cells sealed according to the method employed in Example III sustained no adverse chemical effect of the hardening agent at its light-sensitive portion. Also, the bonded portions of films 12 and 13 exhibited supreme bonding effect. Therefore, in case the photoconductive cell obtained in Example III is compared with that obtained from the conventional metal-glass sealing method, i.e., the so-called harmetic seal, which has been discussed previously in this specification, the cell of the present invention shows an ability not in the least inferior to that of the conventional cell as will be noted from the comparative charts in FIGS. 9, 10 and 11. More specifically, FIG. 9 represents a comparison of illumination-resistance characteristic of two cells whose illumination dependency $\gamma$ is invariably close to 1, one of which cells being sealed according to the method of the present invention and the other being sealed according to the conventional method. In FIG. 9, solid line represents the method of the present invention, whereas broken line represents the conventional method. FIG. 10 shows a comparison of the results of temperature cycling test. In this test, a photoconductive cell was first left in darkness for 23 hours at normal temperature. Thereafter the cell was held at the illumination of 300 Lux for 1 hour. The resistance value exhibited by the cell treated as mentioned above when its light-receiving face was held at the illumination of 1 Lux was used as the reference value. Dot (1) indicates the rate of change in the resistance value of the cell, obtained by first leaving it in darkness for 24 hours at 70° C, thereafter keeping it in darkness for 23 hours at 25° C, then holding it at the illumination of 300 Lux for 1 hour and thereafter holding its light-receiving face at the illumination of 1 Lux. On the other hand, Dot (2) shows the rate of change in the resistance value of the cell, obtained by first leaving it in darkness for 24 hours at −20° C, thereafter keeping it in darkness for 23 hours at 25°C, then holding it at the illumination of 300 Lux for 1 hour and thereafter holding its light-receiving face at the illumination of 1 Lux. In this chart, solid line represents the value in the cell manufactured by the method of the present invention, whereas broken line denotes the value in the cell manufactured by the known conventional method.

Figure 11:
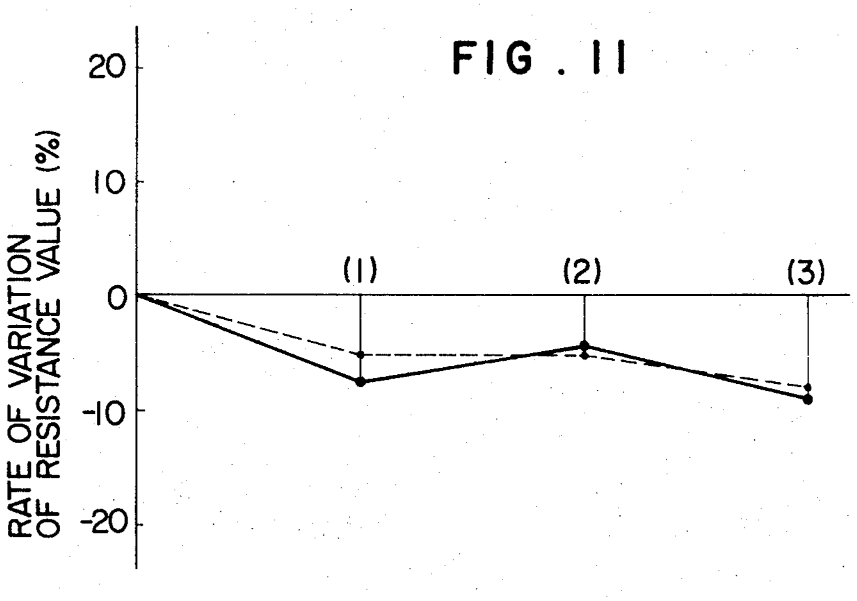
FIG. 11 is a chart showing a comparison of the result of anti-damp cycling test between the cell of the present invention and a known cell.

FIG. 11 shows a comparison of the results of anti-damp cycling test. In this test, a photoconductive cell was first left in darkness for 23 hours at normal temperature. Thereafter the cell was held at the illumination 300 Lux for 1 hour. The resistance value exhibited by the cell treated as mentioned above when its light-receiving face was held at the illumination of 1 Lux was used as the reference value. Dot (1) represents the change rate of the resistance value of the cell, obtained by first leaving it in darkness at 55° C and at the relative humidity of 95 percent for 8 hours, thereafter leaving it in darkness at 25° C and at the relative humidity of 50 percent for 13 hours, thereafter holding it at the illumination of 300 Lux for 1 hour and then holding its light-receiving face at the illumination of 1 Lux. Dot (2) and Dot (3) show the change rates, respectively, where the conditions in Dot (1) were repeated. In the chart, solid line represents the value in the cell manufactured by the method of the present invention, whereas broken line represents the value in the cell manufactured by the conventional method.

We claim

1. A photoconductive cell comprising:

an electrically insulating base plate member having a light-sensitive portion made of a light-responsive substance capable of varying its resistance value depending on the intensity of light incident thereto, and electrode portions made of a conductive substance and being electrically connected to said light-sensitive portion, conductive terminal members electrically connected to said electrode portions, respectively, an electrically insulating transparent or translucent first film member covering that side of said base plate member containing said light-sensitive portion therein, an electrically insulating second film member closely bonded to said first film member and sealing, in cooperation with said first film member, said base plate member and said terminal members therebetween, and one of said film members having a micro-capsulated resin adhesive coated on the inner face thereof, and the other of said film members having a resin hardening agent coated on the inner face thereof, such that when the contacting regions of said film members contact each other, the resin adhesive reacts with the resin hardening agent firmly bonding said film members to each other.

2. A photoconductive cell according to claim 1, in which said first and second film members are polyimide films each being coated, on its inner face, with a transparent synthetic resin, and in which the contacting regions of said first and second film members are bonded together firmly by thermal fusing method.

3. A photoconductive cell according to claim 1, in which said first film member and said second film member are bonded firmly to each other by high frequency wave sealing method.

4. A photoconductive cell according to claim 1, in which said first film member and said second film member are bonded firmly to each other by ultrasonic wave sealing method.

* * * * *